United States Patent
Arnold et al.

(10) Patent No.: US 7,146,490 B2
(45) Date of Patent: *Dec. 5, 2006

(54) PROCESSING SYSTEM AND METHOD FOR EFFICIENTLY ENABLING DETECTION OF DATA HAZARDS FOR LONG LATENCY INSTRUCTIONS

(75) Inventors: Ronny Lee Arnold, Ft Collins, CO (US); Donald Charles Soltis, Jr., Fort Collins, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 427 days.

This patent is subject to a terminal disclaimer.

(21) Appl. No.: 10/636,073

(22) Filed: Aug. 7, 2003

(65) Prior Publication Data

US 2004/0030867 A1  Feb. 12, 2004

Related U.S. Application Data (63) Continuation of application No. 09/490,392, filed on Jan. 24, 2000, now Pat. No. 6,643,762.

(51) Int. Cl.
*G06F 9/30* (2006.01)
*G06F 15/76* (2006.01)
(52) U.S. Cl. ...................... 712/217; 712/216
(58) Field of Classification Search ................ 712/217, 712/216, 224, 229, 1
See application file for complete search history.

(56) References Cited

U.S. PATENT DOCUMENTS

| | | |
|---|---|---|
| 4,891,753 A | 1/1990 | Budde et al. |
| 4,903,196 A | 2/1990 | Pomerene et al. |
| 5,630,149 A * | 5/1997 | Bluhm ...................... 712/217 |

(Continued)

OTHER PUBLICATIONS

Alexander Wolfe, "Patents Shed Light on Merced: Techiniques of Predication and Speculation Detailed," Electronic Engineering Times, Feb. 15, 1999, pp. 43-44.

(Continued)

*Primary Examiner*—Eric Coleman (57) ABSTRACT

Generally, the present invention provides a processing system and method for indicating when there is a pending write to a general register of the processing system. The processing system of the present invention utilizes a plurality of general registers, a plurality of connections, a pipeline, a scoreboard, and hazard detection circuitry. The plurality of connections corresponds respectively with the general registers. The scoreboard maintains a plurality of bits such that each bit indicates whether there is a pending write to a corresponding general register. The scoreboard transmits to the hazard detection circuitry one of the bits that is indicative of whether a pending write to the one general register exists based on a value of the one bit and based on which of the connections is used to transmit the one bit. The hazard detection circuitry then detects whether a data hazard exists based on the one bit.

18 Claims, 6 Drawing Sheets

U.S. PATENT DOCUMENTS

| | | | |
|---|---|---|---|
| 5,737,624 A | | 4/1998 | Garg et al. |
| 5,784,588 A | * | 7/1998 | Leung ........................ 712/216 |
| 5,859,999 A | | 1/1999 | Morris et al. |
| 5,860,017 A | | 1/1999 | Sharangpani et al. |
| 6,108,769 A | * | 8/2000 | Chinnakonda et al. ...... 712/216 |
| 6,219,781 B1 | * | 4/2001 | Arora ......................... 712/217 |
| 6,266,766 B1 | | 7/2001 | O'Conner |
| 6,272,520 B1 | * | 8/2001 | Sharangpani et al. ....... 718/108 |
| 6,304,955 B1 | * | 10/2001 | Arora ......................... 712/217 |
| 6,408,378 B1 | * | 6/2002 | O'Connor ................... 712/217 |
| 6,550,001 B1 | * | 4/2003 | Corwin et al. .............. 712/216 |
| 6,810,475 B1 | * | 10/2004 | Tardieux ..................... 712/219 |

OTHER PUBLICATIONS

Patterson, et al., "Computer Architecture: A Quantitative Approach," Morgan Kaufmann Publishers, Inc., 2ed, pp. 150-193.

Gary Lauterbach, Sun's Next-Generation High-End SPARC Microprocessor Forum, Oct. 14-15, 1997, pp. 3-6.

William J. Bowhill, et al., "Circuit Implementation of a 300-MHz 64-bit Second-generation CMOS Alpha CPU," Digital Technical Journal, vol. 7 No. 1, 1995, pp. 100-114.

* cited by examiner

PROCESSING SYSTEM AND METHOD FOR EFFICIENTLY ENABLING DETECTION OF DATA HAZARDS FOR LONG LATENCY INSTRUCTIONS

CROSS REFERRENCE TO RELATED APPLICATION

This is a continuation of application Ser. No. 09/490,392 filed on Jan. 24, 2000 now U.S. Pat. No. 6,643,762 which is hereby incorporated by reference herein.

BACKGROUND OF THE INVENTION

1. Field of the Invention

The present invention generally relates to data processing techniques and, in particular, to a processing system and method for efficiently indicating when data produced by execution of one instruction is available for use in executing other instructions so that data hazards associated with the one instruction can be detected. The present invention is especially advantageous when the latency for producing the data of the one instruction is relatively long.

2. Related Art

To increase the performance of many processors, pipeline processing has been developed. In pipeline processing, a processor is equipped with at least one pipeline that can simultaneously process multiple instructions. Therefore, execution of one instruction in the pipeline may be commenced before the results of execution of a preceding instruction in the pipeline are available, thereby creating certain data hazards.

For example, a first instruction, when executed, may produce data and write the data to a particular register, and a second instruction, when executed, may utilize the data produced by the first instruction. If the second instruction executes before the data produced by the first instruction is available, then a data error occurs. Consequently, a data hazard exists between the two instructions until the data produced by the first instruction is available. This type of data hazard is commonly referred to as a "read-after-write" (RAW) data hazard.

In another situation, the second instruction, when executed, may write data to the same register as the first instruction, which commenced execution before the, second instruction. If the second instruction produces and writes its data to the register before the first instruction, then a data error is possible, since the register will contain the data of the first instruction instead of the second instruction after both instructions are fully executed and processed. As a result, a data hazard exists between the two instructions until the data produced by the first instruction is written to the register. This type of data hazard is commonly referred to as a "write-after-write" (WAW) data hazard.

To help prevent errors from the aforementioned data hazards and other types of data hazards, most superscalar processors include hazard detection circuitry that detects data hazards associated with the instructions being processed by the pipelines of the processor. The hazard detection circuitry usually detects the aforementioned data hazards by detecting when a later instruction utilizes (e.g., writes to or reads from) the same register as an earlier instruction that has yet to produce available data.

However, the data produced by a first instruction may not be available for use by other instructions or for writing to a particular register of a processor until well after the first instruction has been retired by the pipeline processing the first instruction (e.g., until well after the first instruction has exited the pipeline). For example, a load instruction, when executed, may generate a request to retrieve data from memory external to the processor. Depending on where the data is located in the memory hierarchy, it may take anywhere between a few clock cycles to several thousand clock cycles for the data to be returned to the processor in response to the aforementioned request. Therefore, the processor may not receive the data produced by the first instruction until after the first instruction exits the processor's pipelines or is otherwise retired. In other words, the data produced by the first instruction does not become available for use in executing other instructions until after the first instruction exits the processor's pipeline or is otherwise retired. An instruction, such as the aforementioned load instruction, that produces available data after the instruction has been retired by a pipeline shall be referred to herein as a "long latency instruction."

To facilitate the process of detecting data hazards for long latency instructions, the processor is usually equipped with a register file, commonly referred to as a "scoreboard," that indicates when the processor has yet to receive data produced in response to a previous execution of a producer (i.e., an instruction that produces data). In other words, the scoreboard indicates when there is a pending write to a general register. As used herein, the term "pending write" shall be used to refer to a situation in which data produced by an earlier executed instruction is destined for a general register but has yet to be written to the general register. As known in the art, a "general register" is one of a set of registers that are either written to via the execution of write instructions and/or are read from via the execution of read instructions.

The scoreboard includes a plurality of registers in which each register contains a bit value. Each scoreboard register and the bit value contained therein correspond to one of the general registers of the processor that receives data produced by the execution of write instructions. When a write instruction is retired before the data produced by the write instruction has been written to the general register that is to receive the data, the bit value in the scoreboard register that corresponds to the general register is asserted. Furthermore, when the data produced by the write instruction is finally written to the general register, the aforementioned bit value is deasserted. Therefore, to determine whether there is a pending write to one of the general registers, the bit value in the scoreboard register corresponding to the one general register can be analyzed.

Each asserted bit value in the scoreboard indicates that there is a pending write to the general register corresponding to the asserted bit value. Therefore, any instruction being processed by the processor should be prevented from writing to or reading from the foregoing general register to prevent errors from RAW or WAW data hazards, until at least the pending write expires (i.e., until the data destined for the general register is actually written to the general register). Furthermore, each deasserted bit value in the scoreboard indicates there is presently no pending write to the general register corresponding to the deasserted bit value. Therefore, an instruction being processed by the processor may read from or write to the foregoing general register without creating any errors from RAW or WAW data hazards.

When a RAW or WAW data hazard is detected by analyzing the scoreboard or otherwise, errors from the RAW or WAW data hazard are often prevented by stalling one or more instructions being processed by the processor. U.S. Patent Application entitled "Superscalar Processing System and Method for Efficiently Performing In Order Processing of Instructions," assigned Ser. No. 09/390,199, and filed on Sep. 7, 1999, which is incorporated herein by reference, describes in more detail a process of stalling instructions to prevent data hazards. When an instruction is stalled, the processor temporarily refrains from further processing the instruction until the data hazard causing the stall expires.

Unfortunately, the wiring and other circuitry typically used to write to and read from the scoreboard is relatively complex and often utilizes a relatively large amount of surface area within a processor. To minimize the cost of the processor, it is desirable for the circuitry required to detect data hazards to be minimized. In particular, it is desirable to minimize and simplify the circuitry required to write to and read from the scoreboard.

Thus, a heretofore unaddressed need exists in the industry for providing a efficient system and method of utilizing a scoreboard to detect data hazards.

SUMMARY OF THE INVENTION

The present invention overcomes the inadequacies and deficiencies of the prior art as discussed hereinbefore. Generally, the present invention provides a system and method for executing instructions of a computer program and for efficiently indicating the existences of pending writes to general registers that are used in executing the instructions.

In architecture, the processing system of the present invention utilizes a plurality of general registers, a plurality of connections, a pipeline, a scoreboard, and hazard detection circuitry. The plurality of connections corresponds respectively with the general registers. The scoreboard maintains a plurality of bits such that each bit indicates whether there is a pending write to a corresponding register. The scoreboard transmits to the hazard detection circuitry one of the bits that is indicative of whether a pending write to the one general register exists based on a value of the one bit and based on which of the connections is used to transmit the one bit. The hazard detection circuitry then detects whether a data hazard exists based on the one bit.

In accordance with another feature of the present invention, a decoder is used to decode a register identifier associated with data being written to one of the general registers. The decoder transmits the register identifier to both the scoreboard and the hazard detection circuitry. The hazard detection circuitry may use the register identifier to detect a data hazard, and the scoreboard may use the register identifier to modify one of the bits in the scoreboard.

The present invention can also be viewed as providing a method for processing instructions of a computer program. The method can be broadly conceptualized by the following steps: providing a plurality of general registers; maintaining a plurality of bits, each of the bits respectively corresponding with one of the general registers; providing a plurality of connections, each of the connections respectively corresponding with one of the general registers; indicating, via the bits, which of the general registers are associated with pending writes; transmitting one of the bits corresponding with a particular one of the general registers across a particular one of the connections, the one connection corresponding with the particular one general register; and detecting a data hazard based on the one bit transmitted across the particular one connection.

Other features and advantages of the present invention will become apparent to one skilled in the art upon examination of the following detailed description, when read in conjunction with the accompanying drawings. It is intended that all such features and advantages be included herein within the scope of the present invention and protected by the claims.

BRIEF DESCRIPTION OF THE DRAWINGS

The invention can be better understood with reference to the following drawings. The elements of the drawings are not necessarily to scale relative to each other, emphasis instead being placed upon clearly illustrating the principles of the invention. Furthermore, like reference numerals designate corresponding parts throughout the several views.

DETAILED DESCRIPTION OF THE PREFERRED EMBODIMENT

The present invention generally relates to a processing system that efficiently detects data hazards for long latency instructions with a minimal amount of circuitry and complexity. To better illustrate the principles of the present invention, first refer to FIG. 1, which depicts a conventional superscalar processing system 15. The processing system 15 includes an instruction dispersal unit 18 that receives instructions of a computer program and assigns each instruction to one of a plurality of pipelines 21. Each pipeline 21 is configured to process and execute, if appropriate, each instruction assigned to the pipeline 21.

Each pipeline 21 is usually configured to only process particular types of instructions (e.g., integer operation, floating point operation, memory operation, etc.). Therefore, the instruction dispersal unit 18 is configured to assign each instruction only to a pipeline 21 compatible with the instruction. Furthermore, although control circuitry 24, hazard detection circuitry 25, and register file 27, which is often referred to as a "scoreboard," are shown for simplicity as being coupled to one pipeline 21 in FIG. 1, it should be noted that each pipeline 21 is similarly coupled to the control circuitry 24, the hazard detection circuitry 25, and the scoreboard 27. However, if desired, the connections 31, which couple the one pipeline 21 to a write port of the scoreboard 27, may be removed for any pipeline 21 that does not process a long latency instruction.

Figure 1:
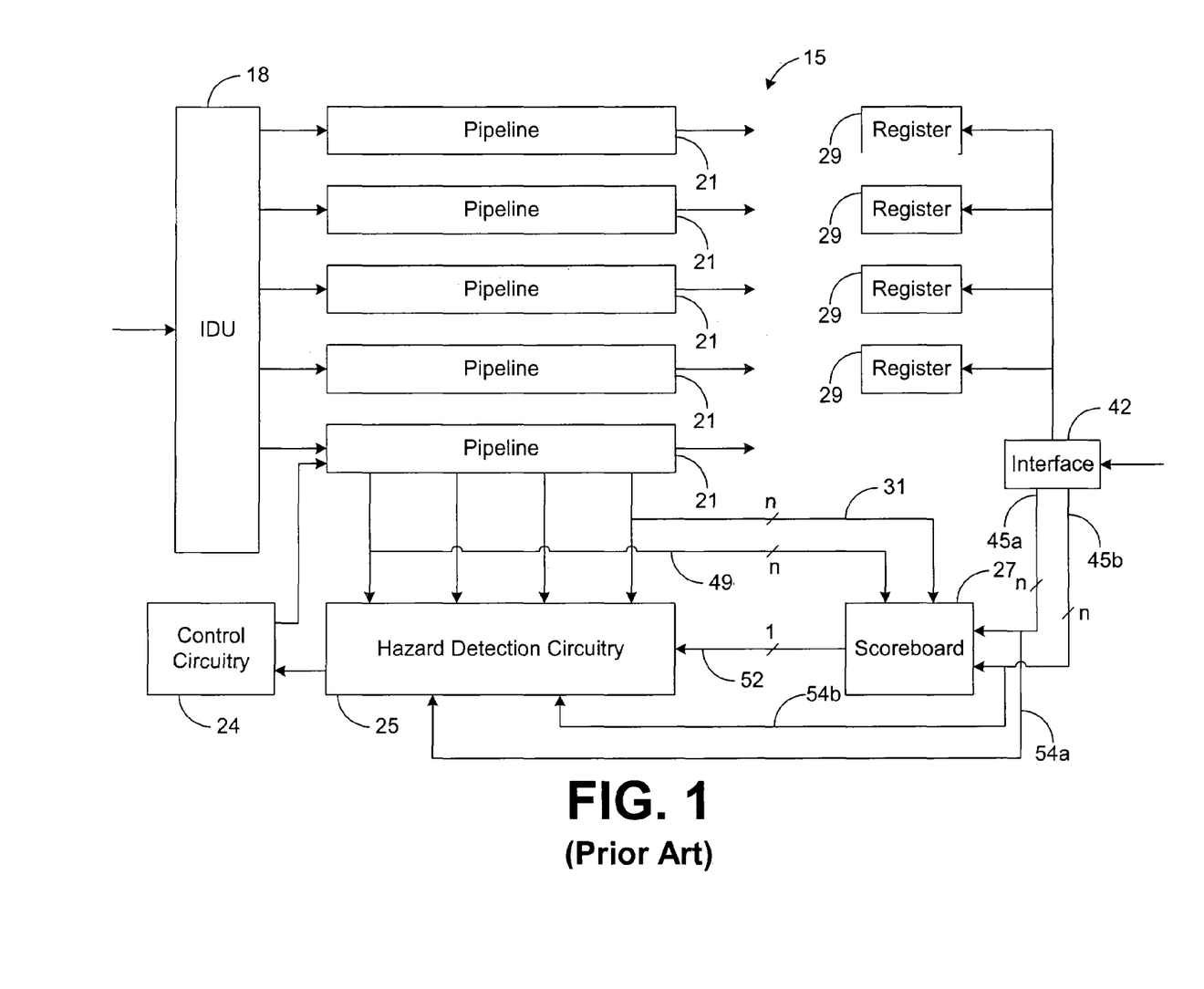
FIG. 1 is a block diagram illustrating a conventional processing system.

It is well known that data is often written to and read from general registers 29 associated with the processing system 15 in executing the instructions received by the processing system 15. Furthermore, when a general register 29 is utilized (i.e., written to or read from) in executing an instruction, the instruction usually includes a register identifier that identifies the general register 29. The register identifier is usually an n-bit encoded binary value that is unique to the general register 29 identified by the register identifier.

The hazard detection circuitry 25 is configured to receive and compare the register identifiers included in the instructions being processed by the pipelines 21 to determine if any data hazards, such as RAW and/or WAW data hazards, exist between the instructions processed by the pipelines 21. If the hazard detection circuitry 25 detects a data hazard, the hazard detection circuitry 25 transmits a notification signal to the control circuitry 24 indicating which instruction in the pipelines 21 is associated with the data hazard. In response, the control circuitry 24 may transmit a control signal to one or more pipelines 21 to cause the one or more pipelines 21 to stall (i.e., temporarily prevent further processing of instructions) in order to prevent a data error associated with the data hazard. Once the data hazard expires, the control circuitry 24 enables the processing of the stalled instruction or instructions to resume.

Execution of some instructions causes the retrieval of data from external registers or locations in memory outside of the processing system 15. When such data is received by the processing system 15, the processing system 15 usually writes the data to a general register 29 identified by the instruction that retrieved the data. Usually, the data is then utilized to execute a later instruction.

The time required to retrieve the data varies depending on where the data is located, and the instruction that requests the retrieval of the data is often retired before the data is received by the processing system 15. However, once an instruction is retired and has exited the pipelines 21, the hazard detection circuitry 25 usually can no longer detect a RAW or a WAW data hazard associated with the instruction by only comparing register identifiers of the instructions in the pipelines 21, even though such a data hazard may exist until the retrieved data is at least received by the processing system 15.

Therefore, additional steps are usually taken to detect data hazards associated with instructions that have been retired. For example, in the embodiment shown by FIG. 1, if a pending write is caused by a producer that is about to be retired, then the register identifier included in the producer and associated with the pending write (i.e., identifying the general register 29 that is to be written to) is transmitted to scoreboard 27 via a set of connections 31. It should be noted that, for simplicity, FIG. 1 shows only one set of connections 31 coupling one of the pipelines 21 to the scoreboard 27. However, there are typically multiple sets of connections 31 that respectively couple multiple pipelines 21 to different write ports of the scoreboard 27. Each pipeline 21 that processes long latency instructions should be coupled to the scoreboard 27 in the manner that the set of connections 31 couples one of the pipelines 21 to the scoreboard 27 in FIG. 1, although more pipelines 21 may be similarly coupled to the scoreboard 27, if desired.

Figure 2:
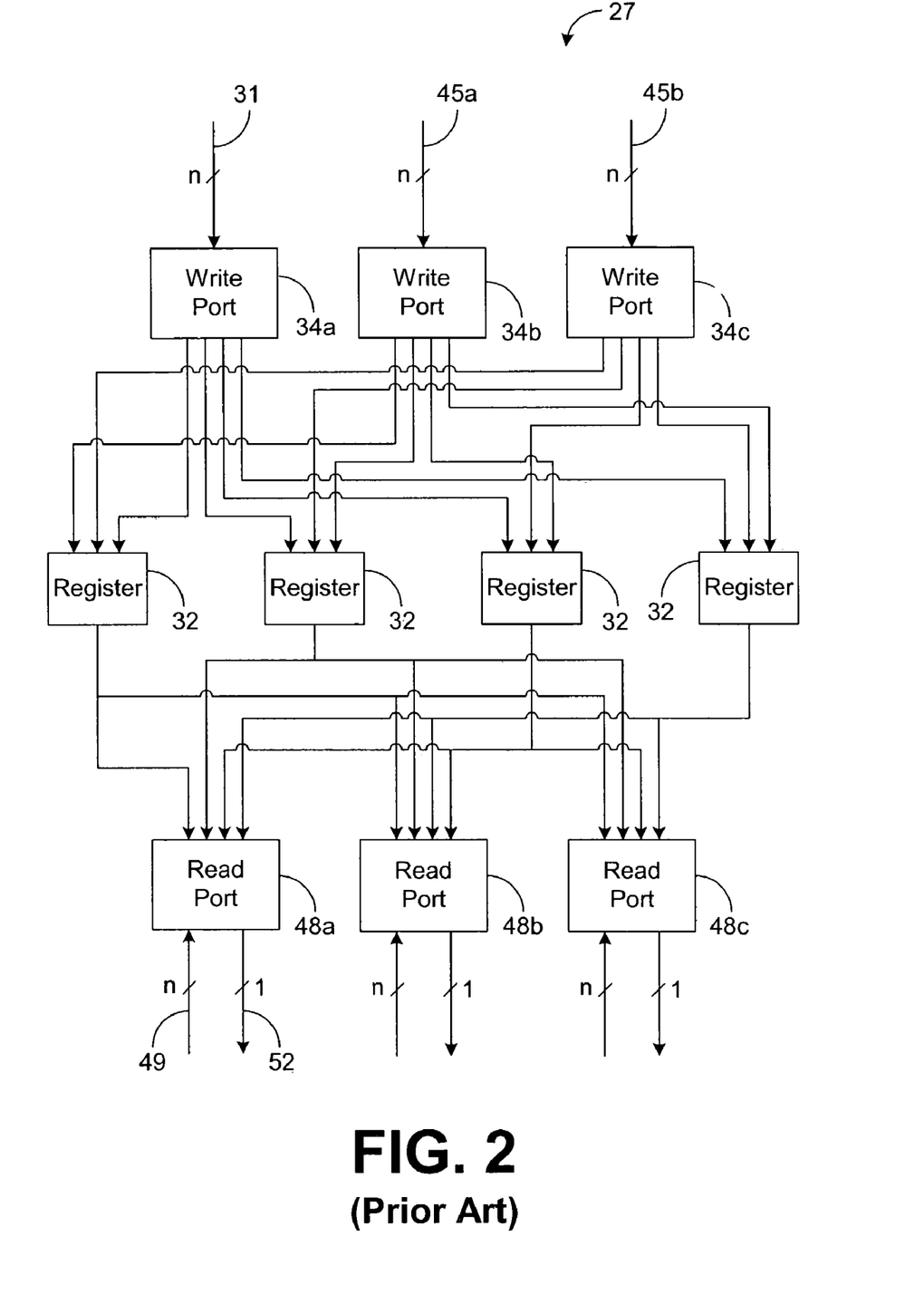
FIG. 2 is a block diagram illustrating a scoreboard of the processing system depicted in FIG. 1.

The scoreboard 27 includes a plurality of registers 32, as shown by FIG. 2. Each of the scoreboard registers 32 respectively corresponds to a different one of the general registers 29 (FIG. 1) and contains a bit value. The scoreboard 27 includes a write port 34a coupled to connections 31. The write port 34a receives the aforementioned register identifier included in the producer associated with the pending write and asserts the bit value in the scoreboard register 32 corresponding to the general register 29 identified by the received register identifier. The register identifier is often encoded, and the write port 34a, therefore, decodes the register identifier before asserting the bit in the appropriate scoreboard register 32.

Referring again to FIG. 1, the data to be written to a general register 29 associated with a pending write is usually received by an interface 42 along with a register identifier that identifies the general register 29. The interface 42 transmits the foregoing data to the identified general register 29 and transmits the register identifier to the scoreboard 27 via connections 45a. The scoreboard 27 includes a write port 34b (FIG. 2) coupled to connections 45a that receives the register identifier from connections 45a and deasserts the bit value in the scoreboard register 32 corresponding to the general register 29 identified by the register identifier.

Since the interface 42 may receive multiple register identifiers in a single cycle, the system 15, as shown by FIGS. 1 and 2, may include multiple sets of other connections, such as connections 45b, and multiple other write ports, such as write port 34c, to respectively transmit and receive each of the register identifiers received by interface 42 to scoreboard 27. Furthermore, the scoreboard 27 usually includes multiple write ports 34a that are respectively coupled to different pipelines 21 for receiving register identifiers from the different pipelines 21. Therefore, the number of write ports 34a, 34b, and 34c can become quite large and the circuitry for interfacing the write ports 34a, 34b, and 34c with the registers 32 can, therefore, be complicated and expensive.

By asserting and deasserting the bit values in the registers 32, as described above, the hazard detection circuitry 25 can detect data hazards associated with retired instructions based on the bits contained in the registers 32 of the scoreboard 27. In this regard, if a bit contained in a scoreboard register 32 that corresponds to a particular one of the registers 29 is asserted, then there exists a pending write to the one general register 29. Consequently, a RAW or WAW data hazard may exist, if another instruction being processed by the pipelines 21 utilizes data from the one general register 29. However, if the bit contained in the foregoing register 32 is deasserted, then there is presently no pending write to the one general register 32 by a retired instruction. Therefore, a RAW or WAW data hazard associated with a retired instruction that writes to the one general register 29 should not exist.

Each pipeline 21 is usually coupled to one read port 48a, as shown by FIGS. 1 and 2 for one of the pipelines 21. To detect a data hazard between a pending instruction in a pipeline 21 and a previously retired instruction, the pipeline 21 usually transmits via connections 49 an encoded n-bit register identifier identifying a general register 29 that is to be used in executing the pending instruction. The read port 48a receives and decodes the register identifier. The read port 48a also analyzes the bit contained in the scoreboard register 32 that corresponds with the general register 29 identified by the register identifier. If the bit in the foregoing scoreboard register 32 indicates that there is a pending write to the general register 29 identified by the register identifier, the read port 48a transmits, via connection 52, a signal indicating that a data hazard associated with the foregoing instruction may exist. For example, if the bit in the scoreboard register 32 analyzed by the read port 48a is asserted, then the read port 48a transmits an asserted one bit signal. Otherwise, the read port 48a transmits a deasserted one bit signal. Based on the signal transmitted across connection 52, the hazard detection circuitry 25 determines whether or not a data hazard associated with the pending instruction exists.

Note that there is a finite amount of delay associated with writing to and reading from the scoreboard 27. Therefore, to quickly provide the hazard detection circuitry 25 with updates, the register identifiers transmitted to the scoreboard 27 via the interface 42 also bypass the scoreboard 27 via bypass connections 54a and/or 54b. In certain situations, the hazard detection circuitry 25 may utilize the register identifiers from bypass connections 54a and/or 54b to prevent or remove a stall on an instruction in one of the pipelines 21.

Furthermore, each instruction may utilize more than one general register 29 when executed and, therefore, may contain more than one register identifier. A separate set of connections 49 and 52 and a separate read port 48a are usually provided for each possible register identifier. For example, if the architecture of the system 15 is such that each instruction in each pipeline 21 may include up to three register identifiers, then there is usually at least three read ports 48a, 48b, and 48c coupled to each pipeline 21 via three sets of connections 49. Therefore, as can be appreciated by one skilled in the art, the number of read ports 48a, 48b, and 48c and connections 49 and 52 in the system 15 can be quite large for many superscalar processors, thereby increasing the amount of wiring and the complexity of the system 15. To reduce the complexity and cost of the system 15 and to conserve valuable space in the system 15, it is desirable to minimize the circuitry utilized in writing to and reading from the scoreboard 27, including the number of write ports 34a, 34b, and/or 34c and read ports 48a, 48b, and/or 48c.

Figure 3:
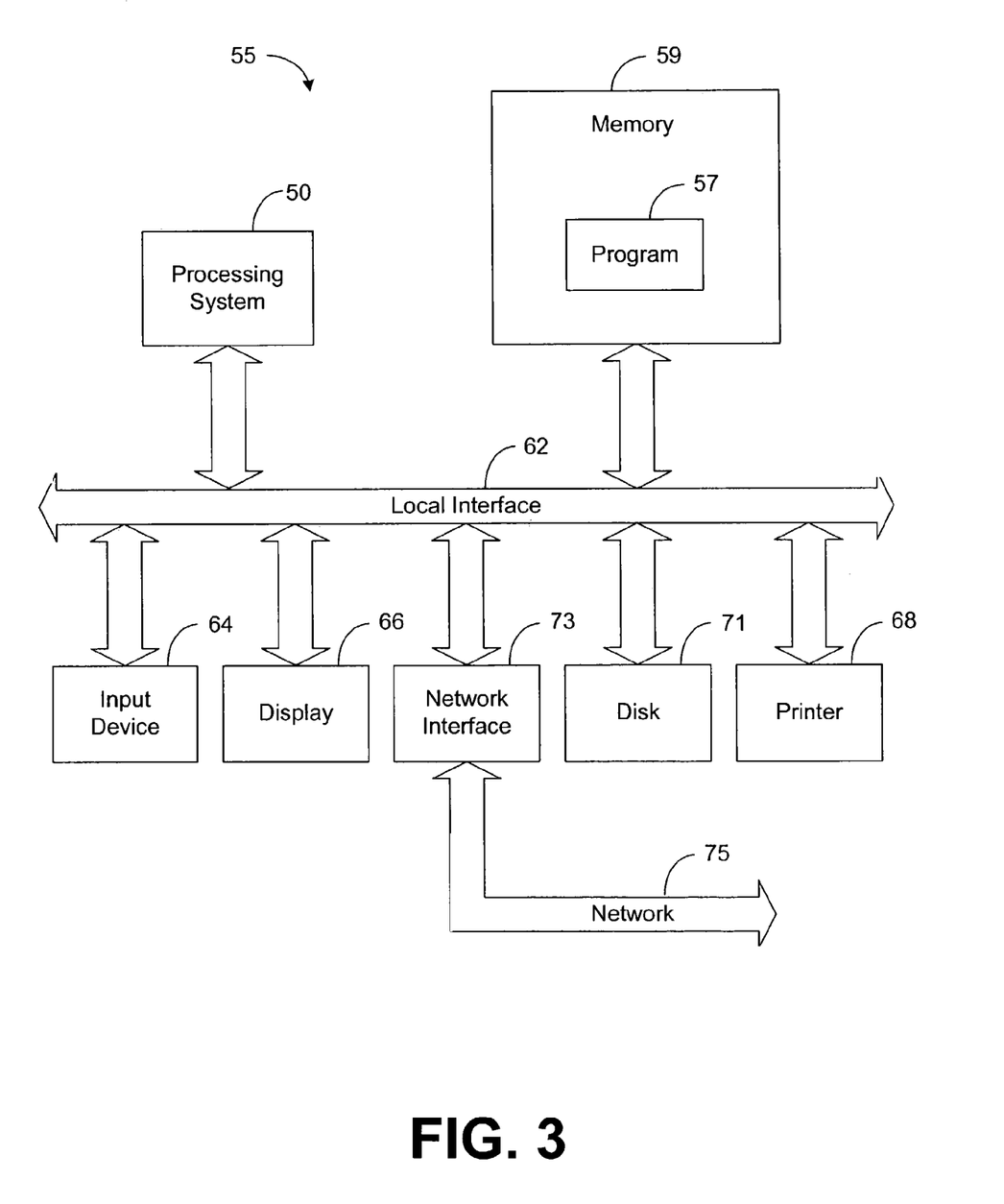
FIG. 3 is a block diagram illustrating a computer system employing a processing system in accordance with the present invention.

In general, the present invention provides a processing system that efficiently and with a minimal amount of circuitry and complexity tracks pending writes caused by retired instructions. FIG. 3 depicts a processing system 50 in accordance with the principles of the preferred embodiment of the present invention. As shown by FIG. 3, the processing system 50 may be employed within a computer system 55 for executing instructions from a computer program 57 that is stored in memory 59.

The processing system 50 communicates to and drives the other elements within the system 55 via a local interface 62, which can include one or more buses. Furthermore, an input device 64, for example, a keyboard or a mouse, can be used to input data from a user of the system 55, and screen display 66 or a printer 68 can be used to output data to the user. A disk storage mechanism 71 can be connected to the local interface 62 to transfer data to and from a nonvolatile disk (e.g., magnetic, optical, etc.). The system 55 can be connected to a network interface 73 that allows the system 55 to exchange data with a network 75.

Figure 4:
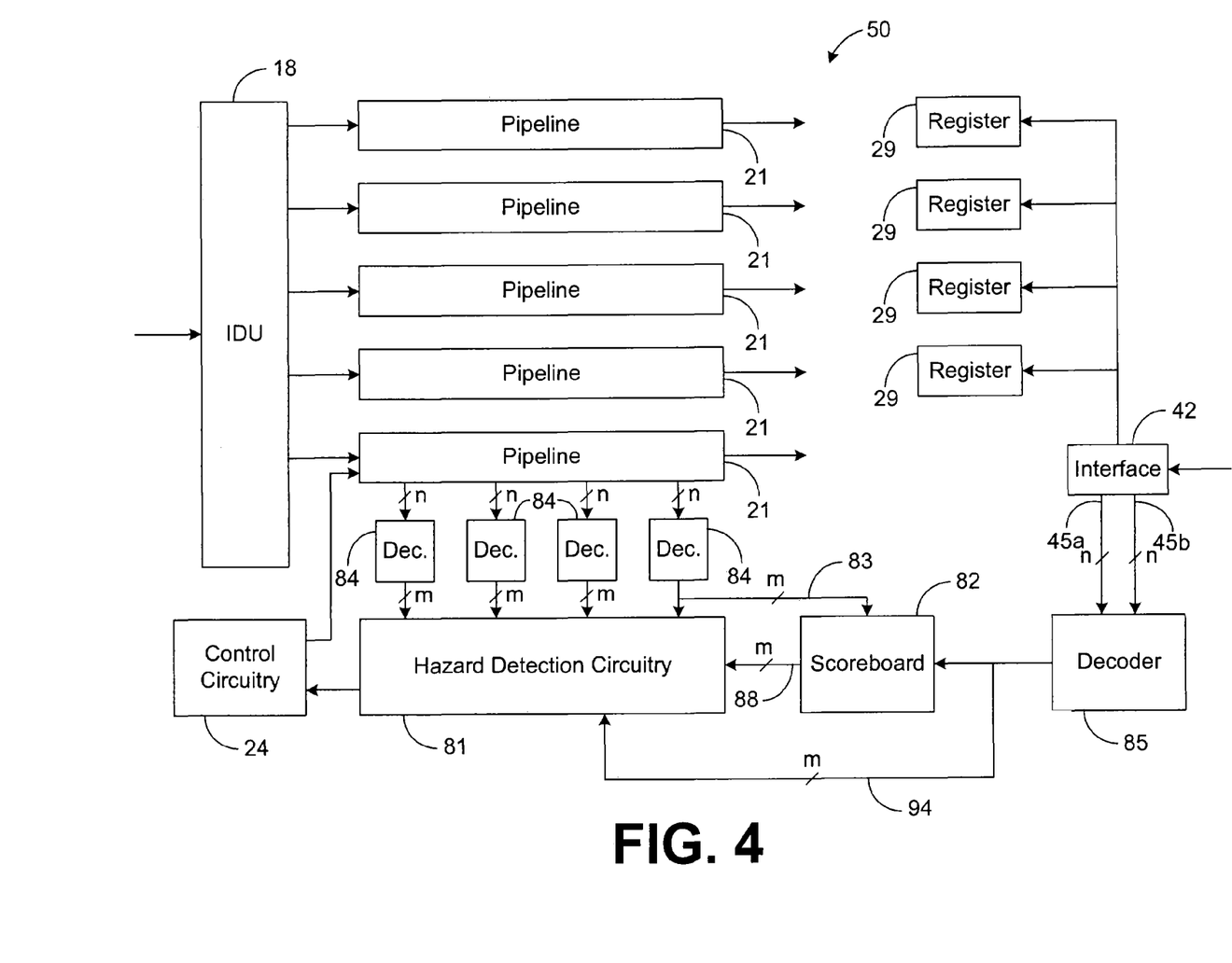
FIG. 4 is a block diagram illustrating the processing system depicted by FIG. 3.

Similar to conventional system 15, processing system 50 includes at least one pipeline 21, control circuitry 24, hazard detection circuitry 81, and a scoreboard 82, as shown by FIG. 4. Although only one pipeline 21 is coupled to the control circuitry 24 and the hazard detection circuitry 81 in FIG. 4, the other pipelines 21 are similarly coupled to the control circuitry 24 and the hazard detection circuitry 81 in the preferred embodiment. Furthermore, FIG. 4 shows one pipeline 21 coupled to the scoreboard 82 via connections 83 and a decoder 84. Each pipeline 21 that processes long latency instructions is similarly coupled to the scoreboard 82 in the preferred embodiment, although other pipelines 21 can be similarly coupled to the scoreboard 82, if desired.

Similar to conventional hazard detection circuitry 25, the hazard detection circuitry 81 of the preferred embodiment detects data hazards associated with the instructions being processed by the pipelines 21, based on the register identifiers of the foregoing instructions. To this end, the register identifier(s) of each instruction in the pipelines 21 is transmitted to the hazard detection circuitry 81, which compares the register identifiers to detect data hazards. However, each n-bit encoded register identifier transmitted to the hazard detection circuitry 81 is first decoded by a decoder 84 into an m-bit register identifier, where m corresponds to the number of general registers 29 used by the system 50 to write and read data produced by the execution of instructions.

In this regard, each bit of an m-bit decoded register identifier corresponds to a particular general register 29. When a decoder 84 receives an n-bit register identifier that identifies one of the general registers 29, the decoder 84 is configured to assert the bit in the m-bit register identifier that corresponds to the one general register 29 and to deassert the remaining bits in the m-bit register identifier. Therefore, by detecting which bit in the m-bit decoded register identifier is asserted, it can be determined which general register 29 is identified by the m-bit decoded register identifier. Commonly assigned U.S. Patent Application entitled "System and Method for Efficiently Detecting Data Hazards Between Instructions of a Computer Program," assigned Ser. No. 09/490,390, and filed on Jan. 24, 2000, and commonly assigned U.S. Patent Application entitled "System and Method for Utilizing Instruction Attributes and Register Identifiers to Detect Data Hazards Between Pipeline Processed Instructions," assigned Ser. No. 09/490,389, and filed on Jan. 24, 2000, which are both incorporated herein by reference, describe in more detail circuitry that may be used to implement the decoders 84 and circuitry that may be used by hazard detection circuitry 81 to detect when the register identifiers of two instructions match and, therefore, when a data hazard may exist between the two instructions.

Figure 5:
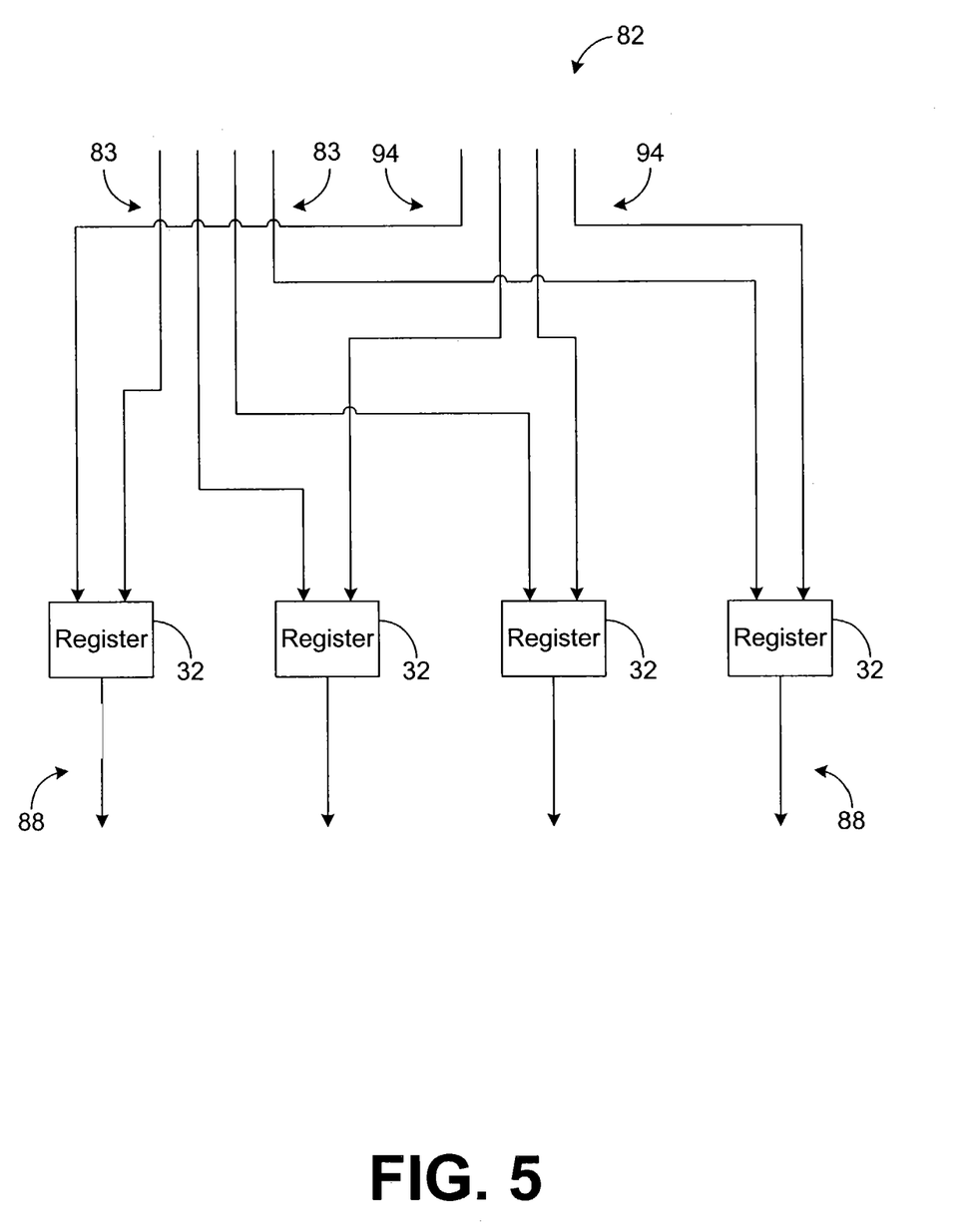
FIG. 5 is a block diagram illustrating a scoreboard of the processing system depicted in FIG. 4.

Similar to conventional scoreboard 27, the scoreboard 82 includes a plurality of registers 32, as shown by FIG. 5, in which each scoreboard register 32 and, therefore, the bit value contained therein correspond to a particular general register 29. When asserted, a bit in a scoreboard register 32 indicates that there is a pending write by a retired instruction to the corresponding general register 29. When deasserted, a bit in a scoreboard register 32 indicates that no such pending write exists.

Therefore, the scoreboard 82, similar to conventional scoreboard 27, indicates which general registers 29 are associated with pending writes caused by retired instructions. However, as previously indicated, scoreboard 27 via write ports 34a, 34b, and 34c typically decodes the register identifiers transmitted across connections 31, 45a, and 45b. In the preferred embodiment, the scoreboard 82 is coupled to at least one of the decoders 84 via connections 83, as shown by FIG. 5. Therefore, the foregoing decoder 84 provides an m-bit decoded register identifier to both the hazard detection circuitry 81 and the scoreboard 82. Since the register identifier transmitted by connections 83 has m bits, each of the connections 83 can be coupled directly to the registers 32, thereby eliminating the need of a write port 34a (FIG. 2) in the scoreboard 82.

In this regard, each bit transmitted across one of the connections 83 is provided to the scoreboard register 32 that corresponds to the same general register 29 as the foregoing bit. In other words, when the m-bit register identifier transmitted across connections 83 identifies a particular one of the general registers 29, only the scoreboard register 32 corresponding to the one general register 29 should receive an asserted bit, and the other scoreboard registers 32 should receive a deasserted bit. As a result, there is no need for a write port 34a (FIG. 2) in the scoreboard 82 to detect which scoreboard register 32 corresponds to the general register 29 identified by the register identifier received by the scoreboard 82. Instead, the same decoder 84 that provides an m-bit register identifier to hazard detection circuitry 81 may also be used to provide the appropriate bit values to the appropriate registers 32. Accordingly, the amount and complexity of the circuitry required to detect data hazards and to appropriately assert the bits in the scoreboard 82 are minimized in the preferred embodiment.

In addition, the register identifiers received from connections 45a and 45b are preferably decoded by a decoder 85 instead of write ports 34b and 34c (FIG. 2) in the scoreboard 82. In this regard, the decoder 85 is configured to receive the n-bit encoded register identifiers presently transmitted from interface 42 and to output an m-bit decoded register identifier identifying each of the general registers 29 identified by the n-bit register identifiers that are received in the same cycle.

In the preferred embodiment, the value m corresponds to the number of general registers 29 in the processing system 50, and each bit of the m-bit decoded register identifier transmitted by decoder 85 corresponds to a different general register 29. The decoder 85 is configured to assert each bit in the m-bit decoded register identifier that corresponds to a general register 29 identified by one of the n-bit register identifiers received in the same cycle and to deassert the remaining bits of the m-bit decoded register identifier. Therefore, a general register 29 is identified by the m-bit decoded register identifier transmitted by decoder 85 when the corresponding bit in the decoded register identifier is asserted.

When the scoreboard 82 receives a new decoded register identifier from the decoder 85, the scoreboard 82 is designed to deassert the bits in the scoreboard registers 32 corresponding to the general registers 29 identified by the decoded register identifier, since the pending writes to the foregoing general registers 29 should no longer exist.

In this regard, each scoreboard register 32 receives a bit of the decoded register identifier from decoder 85. The scoreboard register 32 preferably corresponds to the same general register 29 as the bit received by the scoreboard register 32. In other words, when the decoded register identifier from decoder 85 identifies one of the general registers 29, the scoreboard register 32 corresponding to the identified general register 29 should receive an asserted bit from the decoder 85. Moreover, when the value of a bit received from decoder 85 is asserted, the scoreboard register 32 receiving the asserted bit value is designed to clear (e.g., to deassert) the bit value contained in the register 32. As a result, an asserted bit in a scoreboard register 32 corresponding to a particular one of the general registers 29 indicates that there is presently a pending write to the one general register 29, and a deasserted bit in the scoreboard register 32 indicates that there is presently no such pending write.

When desired, the scoreboard 82 transmits, via connections 88, to hazard detection circuitry 81 a signal corresponding to the data contained in the scoreboard registers 32 so that the hazard detection circuitry 81 can properly detect data hazards, such as RAW and WAW data hazards. In the preferred embodiment, each of the connections 88 is coupled to a different one of the scoreboard registers 32 and, therefore, corresponds to the same general register 29 as the one scoreboard register 32 coupled to the connection 88. Therefore, the signal transmitted to hazard detection circuitry 81 is an m-bit data word, and each bit of the m-bit data word corresponds to a bit value from a different scoreboard register 32. As a result, each asserted bit in the m-bit data word indicates that there is a pending write to a particular one of the general registers 29. The m-bit data word is essentially an m-bit register identifier that may simultaneously identify more than one of the general registers 29. Since each of the scoreboard registers 32 is coupled directly to the hazard detection circuitry 83 via one of the connections 88 in the preferred embodiment, the read ports 48a, 48, and 48c (FIG. 2) in conventional scoreboard 27 can be eliminated.

However, since there is a finite amount of delay in writing to and reading from the scoreboard 27, the data transmitted by the scoreboard 82 is not always updated. As a result, it is possible for the data word transmitted across connection 88 to indicate that a pending write exists, when the pending write has, in fact, recently expired. To provide the hazard detection circuitry 81 with most up-to-date information available, a bypass connection 94 that bypasses the scoreboard 82 provides the decoded m-bit register identifier from decoder 85 to the hazard detection circuitry 81, similar to bypass connections 54a and 54b of conventional system 15.

Figure 6:
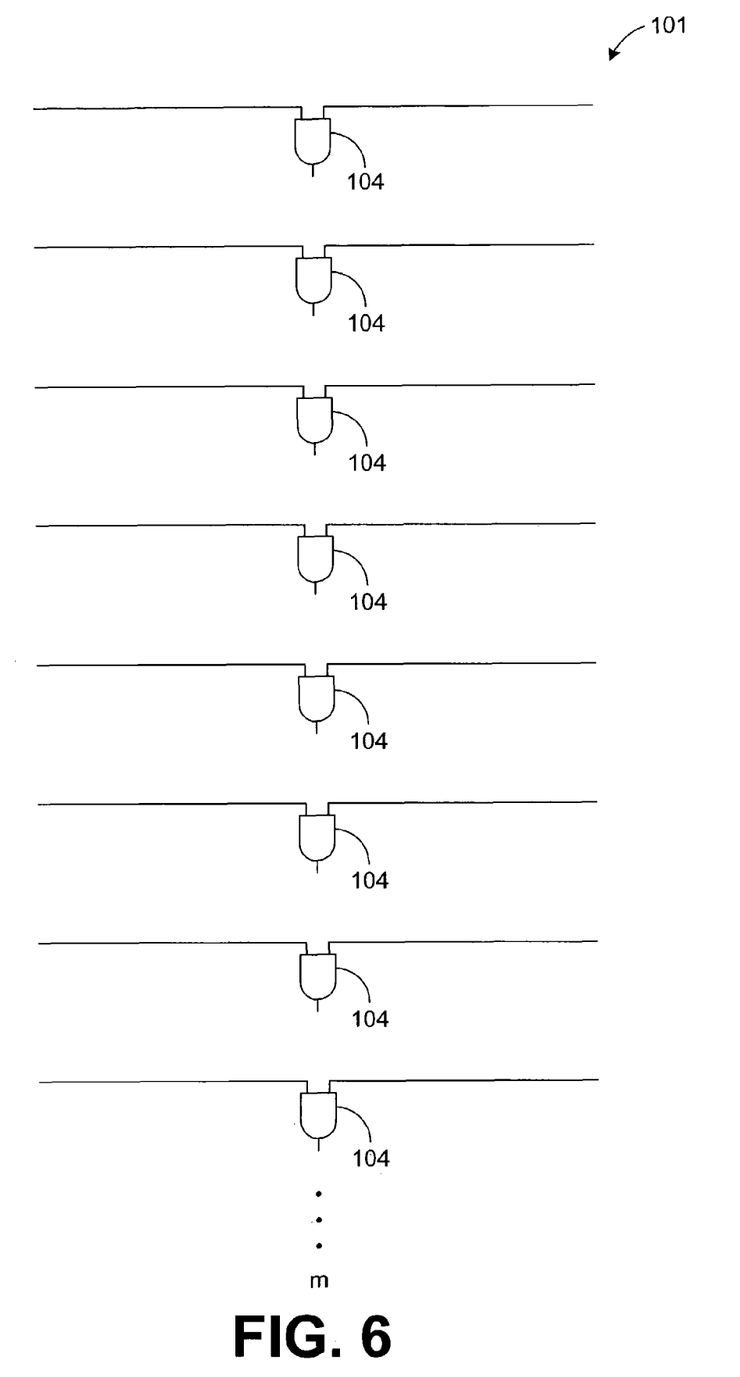
FIG. 6 is a block diagram illustrating circuitry that may be used in implementing hazard detection circuitry depicted in FIG. 4.

The hazard detection circuitry 81 detects data hazards by comparing the m-bit register identifiers received from the pipelines 21 via the decoders 84 to the m-bit register identifier received from connections 88 and/or 94. FIG. 6 shows an exemplary implementation of circuitry 101 that may be used to detect a data hazard by comparing an m-bit register identifier received from the pipelines 21 to the m-bit register identifier received from connections 88 or 94.

Each AND gate 104 receives a bit of the m-bit register identifier from the pipeline 21 and a bit of the m-bit register identifier from the connections 88 or 94. Furthermore, each bit received by the same AND gate 104 corresponds to the same general register 29. Therefore, one of the AND gates 104 should produce an asserted output only when the m-bit register identifier from the pipeline 21 identifies one of the general registers 29 identified by the m-bit register identifier from connections 88 or 94. As a result, if one of the AND gates 104 produces an asserted output, then the instruction associated with the m-bit register identifier from the pipeline 21 utilizes a general register 29 subject to a pending write, and a data hazard associated with the, foregoing instruction may, therefore, exist.

Consequently, when one of the AND gates 104 produces an asserted output, the hazard detection circuitry 81 detects a data hazard associated with the instruction associated with the m-bit register identifier received from the pipeline 21. However, if none of the AND gates 104 produces an asserted output, then there should be no pending write associated with the general register 29 identified by the m-bit register identifier received from the pipeline 21. Therefore, there should be no pending write to the general register 29 utilized by the instruction associated with the m-bit register identifier from the pipeline 21, and the hazard detection circuitry 81 fails to detect a data hazard associated with the foregoing instruction.

According to the foregoing techniques, the hazard detection circuitry 81 may detect a data hazard and transmit a signal to control circuitry 24 indicating that a data hazard associated with one of the instructions in the pipelines 21 exists. In response, the control circuitry 24, in order to prevent a data error from the detected data hazard, may transmit a control signal to the pipeline 21 processing the foregoing instruction indicating that the foregoing instruction should be stalled. In response, the pipeline 21 preferably stalls the instruction.

By later comparing the m-bit register identifier associated with the foregoing instruction with the m-bit register identifier received from connections 88 or 94, the hazard detection circuitry 81 may detect that the aforementioned data hazard no longer exists. In this regard, the data destined for the general register 29 utilized by the instruction may have been received by the processing system 50, thereby causing the aforementioned data hazard to expire. In response to the failure of the hazard detection circuitry 81 to detect a data hazard associated with the aforementioned instruction, the control circuitry 24 transmits a control signal to the pipeline 21 processing the instruction indicating that the instruction should not be stalled. In response, the pipeline 21 removes the stall on the instruction, and processing of the instruction by the pipeline 21 resumes.

It should be noted that the decoder 85 is not a necessary feature of the present invention. In this regard, it is possible for the scoreboard 82 to include circuitry for decoding, if necessary, the register identifiers received from connections 45a and/or 45b, and the register identifiers transmitted across connections 45a and/or 45b may be transmitted directly to hazard detection circuitry 81, similar to conventional system 15. In such an embodiment, the hazard detection circuitry 81 may include decoders for appropriately decoding the register identifiers transmitted across connections 45a and/or 45b, if necessary.

Furthermore, for simplicity, the systems 15 and 50 have been shown herein as containing only four general registers 29. Therefore, the value of m preferably equals four in the embodiments shown by the drawings. However, the system 50 can include any number of registers 29 in other embodiments, and the value of m, therefore, can be other integer values in other embodiments. Furthermore, it is possible for the register identifiers to be decoded or encoded into data words with lengths greater than or less than m, although such embodiments are usually less efficient than the preferred embodiment. In this regard, providing the hazard detection circuitry 81 with m-bit register identifiers not only may reduce the circuitry of the system 50, but may also simplify and/or enable better detection of data hazards by data hazard circuitry 81.

In addition, as can be seen by comparing FIG. 5 to FIG. 2, the configuration of the preferred embodiment eliminates the need of including read ports 48a, 48b, and 48c in the scoreboard 82. Furthermore, one of the decoders 84 may efficiently perform the functionality of decoding a register identifier that is to be transmitted to both the scoreboard 82 and the hazard detection circuitry 81. As a result, the amount of circuitry needed to implement the system 50 is minimized in the preferred embodiment, thereby minimizing the cost and complexity of the system 50.

OPERATION

The preferred use and operation of the processing system 50 and associated methodology are described hereafter.

Assume that in processing the instructions of computer program 57 (FIG. 3), the processing system 50 (FIG. 4) receives a first instruction that, when executed, causes data (hereinafter referred to as the "retrieved data") to be retrieved from memory 59 and stored in a general register 29 of the processing system 50. Also, assume that the processing system 50 later receives a second instruction from the program 57 that, when executed, utilizes the retrieved data. Since the aforementioned general register 29 is utilized to execute both instructions, the first instruction and the second instruction both include a register identifier identifying the aforementioned general register 29.

While the first instruction and the second instruction are simultaneously processed by the pipelines 21, the hazard detection circuitry 81 can detect a RAW data hazard between the two instructions by comparing the decoded register identifiers of the two instructions. At some point, the control circuitry 24 may cause the second instruction to be stalled to prevent an error associated with the RAW data hazard. If the first instruction is retired before the retrieved data is received by processing system 50, then the RAW hazard may exist between the first instruction and second instruction, even though the first instruction is retired.

To enable the hazard detection circuitry 81 to detect the RAW hazard after first instruction is retired, an m-bit register identifier identifying the general register 29 that is to receive the retrieved data is transmitted to scoreboard 82 via connections 83, which are coupled to the pipeline 21 processing the first instruction. In response, the scoreboard 82 asserts the bit in the scoreboard register 32 (FIG. 5) that corresponds with the general register 29 identified by the foregoing register identifier (i.e., the general register 29 that is to receive the retrieved data).

Based on the bit value contained in the foregoing scoreboard register 32 and the register identifier of the second instruction, the hazard detection circuitry 81 may detect the aforementioned RAW data hazard, even though the first instruction has been retired. In response, the control circuitry 24 may then cause the second instruction to be stalled.

When the retrieved data is received by the interface 42, the register identifier identifying the general register 29 to receive the retrieved data is transmitted to decoder 85 via connections 45a or 45b. In response to the register identifier, the decoder 85 produces an m-bit decoded register identifier that identifies at least the foregoing general register 29. In this regard, the bit in the decoded register identifier corresponding to the foregoing general register 29 is asserted. This m-bit register identifier is then transmitted to scoreboard 82, which deasserts the bit in the scoreboard register 32 (FIG. 5) corresponding to the foregoing general register 29 in response to the asserted bit in the decoded register identifier. The m-bit register identifier transmitted to scoreboard 82 is also transmitted to hazard detection circuitry 81 via bypass connection 94.

Based on either the deasserted bit value in the aforementioned scoreboard register 32 or the foregoing m-bit register identifier transmitted across bypass, connection 94, the hazard detection circuitry 81 detects that the RAW hazard no longer exists. In response, the control circuitry 24 removes the stall on the second instruction, and processing of the second instruction resumes without causing a data error associated with the aforementioned RAW data hazard.

Although the present invention has been described herein as utilizing the scoreboard 82 to indicate when data produced by long latency instructions is unavailable, it should be noted that the scoreboard 82 may be similarly used to indicate when data produced by any type of instruction is unavailable. In particular, the scoreboard 82 may be used to indicate whether data produced by pending instructions (i.e., instructions that have yet to be retired and are still being processed by the pipelines 21) is unavailable. Furthermore, although the present invention has been described herein in some examples as utilizing the scoreboard 82 to indicate whether data produced by a load instruction is unavailable, the present invention should not be so limited, and the scoreboard 82 may also be used to indicate whether data produced by any other type of instruction is unavailable.

It should be emphasized that the above-described embodiments of the present invention, particularly, any "preferred" embodiments, are merely possible examples of implementations, merely set forth for a clear understanding of the principles of the invention. Many variations and modifications may be made to the above-described embodiment(s) of the invention without departing substantially from the spirit and principles of the invention. All such modifications and variations are intended to be included herein within the scope of this disclosure and the present invention and protected by the following claims.

The invention claimed is:

1. A computer system for processing instructions of a computer program, comprising:
   a plurality of registers;
   a plurality of connections corresponding respectively with said registers;
   at least one pipeline configured to process and execute said instructions;
   decoding circuitry coupled to said at least one pipeline, said decoding circuitry configured to decode a plurality of encoded register identifiers associated with said instructions into a plurality of decoded register identifiers, one of said decoded register identifiers having a plurality of bits identifying at least one of said registers, each bit of said one decoded register identifier corresponding with a respective one of said plurality of registers;
   a scoreboard coupled to said plurality of connections and said decoding circuitry, said scoreboard having a plurality of bits corresponding respectively with said plurality of registers, said scoreboard configured to transmit each of said bits across a different one of said connections, each of said bits indicative of whether a pending write to a corresponding one of said registers exists, said scoreboard configured to update at least one of said bits of said scoreboard based on said one decoded register identifier; and
   hazard detection circuitry coupled to each of said plurality of connections and to said decoding circuitry, said hazard detection circuitry configured to receive each of said decoded register identifiers from said decoding circuitry and to detect data hazards by comparing bits of said decoded register identifiers, including at least one bit of said one decoded register identifier, to said transmitted by said scoreboard.

2. The system of claim 1, wherein said transmitted bits form a data word transmitted from said scoreboard to said hazard detection circuitry, each asserted bit in said data word indicating that a different one of said registers is associated with a pending write.

3. The system of claim 1, wherein said scoreboard includes a plurality of registers, each of said scoreboard registers containing a different one of said scoreboard bits and connected to a different one of said connections.

4. The system of claim 1, wherein said one decoded register identifier includes a plurality of bits, wherein each of said bits in said decoded register identifier that corresponds to said at least one register is asserted, and wherein the remaining bits in said decoded register identifier are deasserted.

5. A system for processing instructions of computer programs, comprising:
   at least one pipeline;
   a plurality of registers;
   a plurality of connections, each of said connections corresponding to a different one of said registers;
   a decoder configured to decode a register identifier from said at least one pipeline to a decoded register identifier having a first plurality of bits, each of said first plurality of bits corresponding with a respective one of said plurality of registers, said decoded register identifier identifying at least one of said registers;
   means for maintaining a second plurality of bits and for indicating via said second plurality of bits which of said registers is associated with a pending write, said maintaining means configured to transmit said second plurality of bits across said connections, wherein each bit transmitted across each of said connections is indicative of whether the register corresponding to said each connection is associated with a pending write, said maintaining means further configured to update said second plurality of bits based on said decoded register identifier; and
   hazard detection circuitry configured to perform comparisons between said second plurality of bits and said decoded register identifier, said hazard detection circuitry further configured to detect at least one data hazard based on said comparisons.

6. The system of claim 5, wherein said maintaining means includes a plurality of registers, each of said registers of said maintaining means containing a different one of said second plurality of bits and connected to a different one of said connections.

7. A system for processing instructions of computer programs, comprising:
   at least one pipeline;
   a plurality of registers;
   a plurality of connections, each of said connections corresponding to a different one of said registers;
   means for maintaining a plurality of bits and for indicating via said bits which of said registers is associated with a pending write, said maintaining means configured to transmit said bits across said connections, wherein each bit transmitted across each of said connections is indicative of whether the register corresponding to said each connection is associated with a pending write;
   hazard detection circuitry configured to perform comparisons between said bits and a decoded register identifier associated with at least one instruction presently in said at least one pipeline, said hazard detection circuitry further configured to detect at least one data hazard based on said comparisons; and
   means for decoding, into said decoded register identifier, an encoded register identifier associated with said at least one instruction, said decoding means configured to transmit said decoded register identifier to said hazard detection circuitry and to said maintaining means, said decoded register identifier identifying at least one of said registers,
   wherein said decoded register identifier includes a plurality of bits, wherein each of said bits in said decoded register identifier that corresponds to said at least one register is asserted, and wherein the remaining of said bits in said decoded register identifier are deasserted.

8. A method for processing instructions of computer programs, comprising the steps of:
   processing said instructions via at least one pipeline;
   providing a plurality of registers;
   receiving an encoded register identifier from said at least one pipeline;
   decoding said received register identifier into a decoded register identifier;
   updating at least one of said bits based on said decoded register identifier;
   maintaining a plurality of bits, each of said bits indicating whether a corresponding one of said registers is associated with a pending write;
   transmitting a data word, said data word including each of said bits, wherein each asserted bit in said data word indicates that a different one of said registers is associated with a pending write;

receiving said data word;

comparing said data word to said decoded register identifier; and detecting a data hazard based on said comparing step.

9. A method for processing instructions of computer programs, comprising the steps of:

processing said instructions via at least one pipeline;

providing a plurality of registers;

decoding at least one register identifier associated with at least one of said instructions into a decoded register identifier having a plurality of bits, each of said bits corresponding with a respective one of said plurality of registers, said decoded register identifier identifying at least one of said registers;

maintaining a plurality of bits within a scoreboard, each of said scoreboard bits respectively corresponding with one of said registers;

providing a plurality of connections, each of said connections respectively corresponding with one of said registers;

indicating, via said scoreboard bits, which of said registers are associated with pending writes;

transmitting, from said scoreboard, each of said scoreboard bits across a different one of said connections;

updating at least one of said scoreboard bits in said scoreboard based on said decoded register identifier;

comparing at least one of said transmitted bits to at least one of said bits of said decoded register identifier; and detecting a data hazard based on said comparing step.

10. A system for processing instructions of computer programs, comprising:

a plurality of registers;

a plurality of connections;

at least one pipeline;

a decoder configured to receive an encoded register identifier from said at least one pipeline and to decode said received register identifier into a decoded register identifier identifying at least one of said registers;

a scoreboard having data indicative of whether each of said plurality of registers is respectively associated with a pending write, said scoreboard configured to transmit said data across said connections and to update said data based on said decoded register identifier; and hazard detection circuitry coupled to said connections and configured to receive said transmitted data and to perform a comparison between said transmitted data and said decoded register identifier, said hazard detection circuitry further configured to detect a data hazard based on said comparison.

11. The system of claim 10, wherein said transmitted data comprises a plurality of bits, each of said bits indicative of whether a corresponding one of said registers is associated with a pending write.

12. A method for processing instructions of computer programs, comprising the steps of:

processing said instructions via at least one pipeline;

using a plurality of registers to execute said instructions;

receiving from said at least one pipeline an encoded register identifier identifying at least one of said registers;

decoding said received register identifier into a decoded register identifier identifying each of said register identified by said encoded register identifier;

storing, in a scoreboard, data indicative of which of said registers is associated with a pending write;

transmitting said data from said scoreboard;

decoding said received register identifier into a decoded register identifier identifying each of said registers identified by said encoded register identifier;

updating said data in said scoreboard based on said decoded register identifier;

comparing said transmitted data to said decoded register identifier; and detecting a data hazard based on said comparing step.

13. The method of claim 12, wherein said transmitted data comprises a plurality of bits, each of said bits indicative of whether a corresponding one of said registers is associated with a pending write.

14. The system of claim 5, wherein each of said first plurality of bits corresponding to said at least one register identified by said decoded register identifier is asserted, and wherein the remaining of said first plurality of bits are deasserted.

15. The method of claim 8, wherein said decoded register identifier includes a plurality of bits identifying at least one of said registers, wherein each of said bits in said decoded register identifier corresponds with a respective one of said registers, wherein each of said bits in said decoded register identifier corresponding to said at least one register identified by said decoded register identifier is asserted, and wherein the remaining of said bits in said decoded register identifier are deasserted.

16. The method of claim 9, wherein each of said bits of said decoded register identifier corresponding to said at least one register identified by said decoded register identifier is asserted, and wherein the remaining of said first plurality of bits are deasserted.

17. The system of claim 10, wherein said decoded register identifier includes a plurality of bits, wherein each of said bits in said decoded register identifier corresponds with a respective one of said registers, wherein each of said bits in said decoded register identifier corresponding to said at least one register identified by said decoded register identifier is asserted, and wherein the remaining of said bits in said decoded register identifier are deasserted.

18. The method of claim 12, wherein said decoded register identifier includes a plurality of bits, wherein each of said bits in said decoded register identifier corresponds with a respective one of said registers, wherein each of said bits in said decoded register identifier corresponding to said at least one register identified by said decoded register identifier is asserted, and wherein the remaining of said bits in said decoded register identifier are deasserted.

* * * * *